June 15, 1926.
C. C. SPRINKLE
CONTAINER AND DISPENSER
Filed Jan. 15, 1925
1,588,552
2 Sheets-Sheet 1
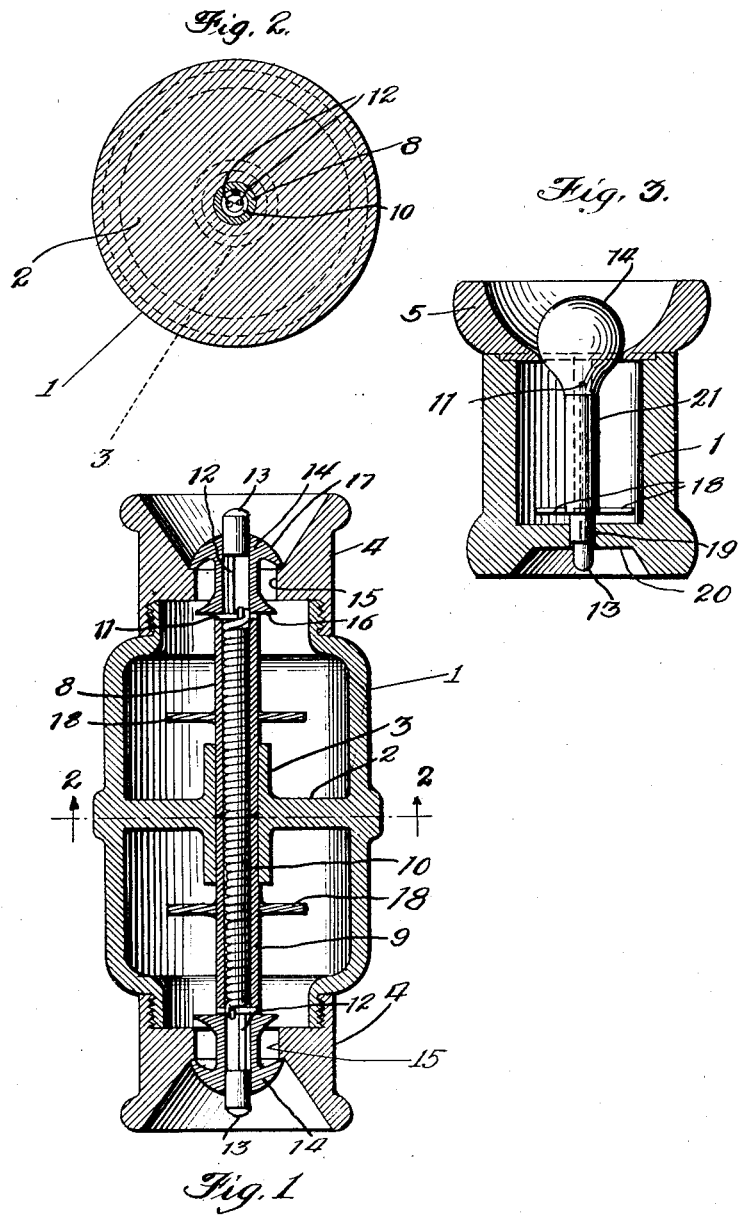

June 15, 1926.
C. C. SPRINKLE
CONTAINER AND DISPENSER
Filed Jan. 15, 1925  2 Sheets-Sheet 2
1,588,552
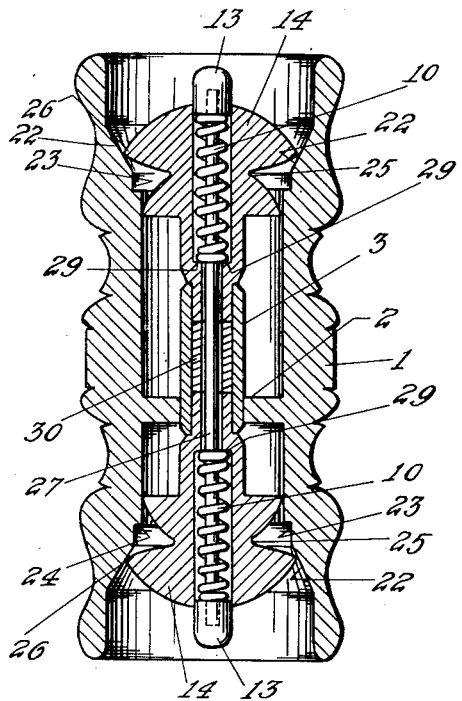
FIG. 4
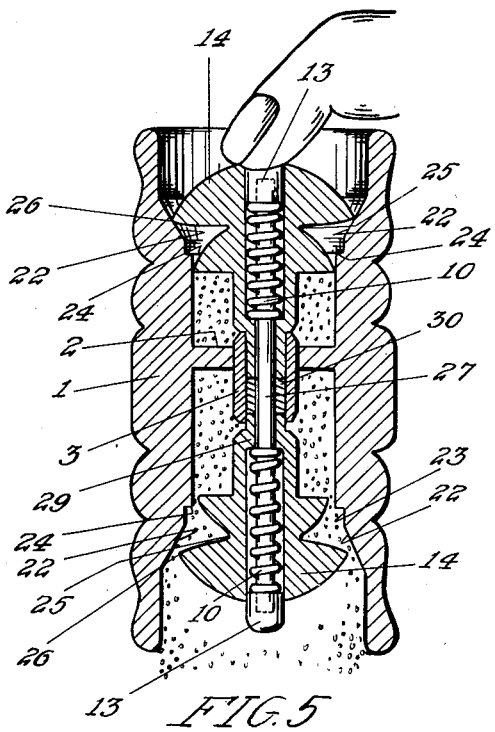
FIG. 5
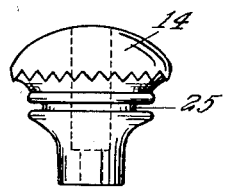
FIG. 6
FIG. 8
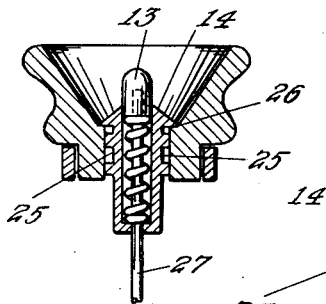
FIG. 7
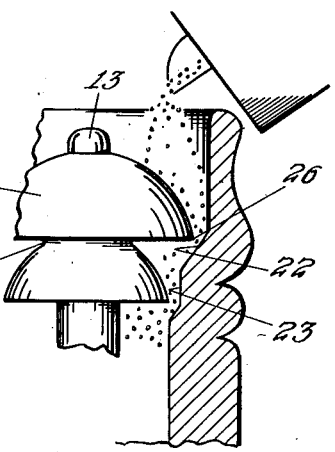
FIG. 9
WITNESS:
G. W. Hjelm
INVENTOR:
C. C. Sprinkle
BY
H. J. Sanders
ATTORNEY.

Patented June 15, 1926.

1,588,552

UNITED STATES PATENT OFFICE.

CLARENCE C. SPRINKLE, OF MARION, INDIANA.

CONTAINER AND DISPENSER.

Application filed January 15, 1925. Serial No. 2,607.

This invention relates to improvements in containers and dispensers for condiments, powders, granules, and the like and one object is to provide a device of this class that is simple in construction, cheap to manufacture, positive and efficient in operation, of few parts and consequently not liable to get out of order.

A further object is to provide a double container that will dispense its contents in a thoroughly satisfactory manner, in the precise quantity or quantities desired by the user, without clogging the vents, without jamming or interference of the working parts and that consequently will not waste the contents.

A still further object is to provide a double container that will contain and dispense matter of more than one kind, such as salt and pepper; preserving them separate one from the other previous to dispensing them, and keeping them so inclosed and protected as to insure them from contact with the surrounding atmosphere thus keeping out dust, dirt and extraneous matter generally, as well as excluding moisture which would cause clogging.

A still further object is to provide a double container that is sanitary, easy to fill when empty, economical in use and that marks a substantial advance in the art including improvements, refinements and advantages, as well, over my Patent No. 968,890, issued Aug. 30, 1910.

Other objects of the invention will appear as the nature of the same is better understood, the invention residing in the combination, construction and arrangement of parts to be hereinafter more fully described, particularly pointed out in the claims and illustrated in the accompanying drawings which form a part of this application and in which—

Fig. 1 is a longitudinal sectional view illustrating one embodiment of the invention.

Fig. 2 is a cross section taken on line 2—2 of Fig. 1.

Fig. 3 is a slightly modified form of container adapted to hold but one kind of matter.

Fig. 4 is a longitudinal sectional view illustrating the preferred embodiment of the invention.

Fig. 5 is a similar view of a preferred form showing the manner of ejecting part of its contents.

Figs. 6, 7 and 8 are details of different types of plunger heads that may be employed.

Fig. 9 is a fragmentary sectional view illustrating the manner of filling the container.

Like reference characters denote corresponding parts throughout the several views.

The container comprises essentially a tubular body portion which may be provided at its ends with or without a screw cap, or screw caps, the body being of one-piece formation and having an interior transverse partition, formed with a central perforation, or with a central guide sleeve which perforated portion, or guide sleeve as the case may be, receives the meeting ends of a two-piece tubular plunger which encases a longitudinally extending contractile coil spring that serves to yieldingly retain the check valve, or valves, in closed position whereby the contents of the body portion are normally retained within that member.

The guide sleeve may be integral with the partition or separate and the plungers may house one or two springs. While several forms or modifications of the structure are shown they have to do with the detail of crushing lumps that may form in the contents of the container or with the ejection of the contents thereof.

The tubular body 1 may be formed of any material and in a variety of shapes. This body is open at its ends and is provided with a centrally disposed transverse partition 2 which is perforated at its center, approximately, and which may be formed integral with the guide sleeve 3, or the latter may be separate therein. The ends of the body 1 may be threaded exteriorly as shown in Fig. 1 and provided with screw caps 4 on its ends, or the ends of the body portion may be grooved to receive the cap 5 shown in Fig. 3, or the caps may be eliminated entirely, the ends of the body then serving the purpose. No cap is provided for the forms shown in Figs. 4, 5, and 9 as the openings in the ends thereof are closed in a manner to be hereinafter described.

A two-piece plunger comprising the separable sections 8, 9 is provided in the form shown in Fig. 1, the ends of the plunger telescoping into the sleeve 3, the plungers containing a coil spring 10, the ends of said spring being secured to the cross pins 11 which pins either rest upon the outer ends of the plunger or are disposed in small perforations in the wall thereof, said pins being connected also to wire rods 12 connected to buttons 13 slidably arranged in the tubular valves 14 that normally close the perforations 15 formed in the caps 4.

The valve 14 shown in Fig. 1 extends entirely through the cap perforation 15 and is separated from the adjacent end of the plunger section 8 or 9 by the cross pin 11, said valve having a smaller flared portion 16 and a larger flared portion 17 which portions are disposed upon opposite sides of the perforation and are adapted to close the same at either end. The plunger sections are formed with the laterally extending wings or agitators 18 adapted to break up any lumps that may form in the contents of the container. In use one button 13 is depressed by the finger of the operator. This will cause the wire rod 12 to unseat the valve 14 at the opposite end. By repeatedly depressing and releasing the button 13 the contents may be ejected from the opposite end of the body in small portions at each movement of the button. The same movement will cause the agitators to break up such lumps as may have formed in the contents.

In Fig. 3 the button 13 is connected to the ball-shaped check valve 14 that seats in a perforation in the cap 5, a stem 19 being arranged in a perforation in the base 20, said valve, a sleeve 21 and agitators 18 carried by said sleeve being moved with each movement of the button. A coil spring returns the parts to normal position just as in Fig. 1. There is but one compartment to this container and it is filled by pressing inwardly the button 13 when the body 1 is inverted substantially as shown in Fig. 9.

In Figs. 4 and 5 the body 1 is formed near each of its ends interiorly with the beveled portion 22 that merges into the annular recess 23 that terminates at the shoulder 24 that serves as a ledge for a portion of the contents when the body is being filled. The valve 14 is formed with one or more grooves 25, the outer end of said valve being of a diameter, at its widest portion 26, greater than the interior diameter of the body 1 so that said valve cannot travel inwardly of said body beyond the bevelled body portion 22. The inner and smaller ends of the opposed valves 14 slidably engage the sleeve 3 and encompass the rod 27 that extends through the said valves 14 and connects the buttons 13, coil springs encircling opposite ends of said rod abut the buttons 13 and shoulders 29 formed in the interior of the valve stems, said stems terminating within the sleeve 3 for engagement with the enlarged portion 30 of the rod 27.

By pressing inwardly upon one button 13 the rod 27 and the opposite valve 14 are forced outwardly until the contents, in part, of the body upon that side of the partition 2 are permitted to escape as shown in Fig. 5. When the container is used for salt and pepper the storage space upon one side of the partition 2 is larger than that upon the opposite side thereof to provide for a relatively greater quantity of salt. It is then customary to dispose the greater part of the sleeve 3 in the salt compartment as shown in Figs. 4 and 5, the pepper compartment being the smaller compartment in both cases.

This container is filled as shown in Fig. 9. The button 13 at the lower end of the container is pressed inwardly to raise the upper valve 14 clear of the inner periphery of the body 1 so that the material may pass between the valve 14 and body 1 into the body upon the partition 2. When the button 13 is released the valve 14 will seat again, as shown in Fig. 4 thus retaining the contents for use.

What is claimed is:—

1. In a condiment container and dispenser, a tubular body formed of a single piece of material, the ends of said body being of a greater interior diameter than its intermediate portion, an inner transverse perforate partition dividing the intermediate body portion into a large and a small compartment, a guide sleeve arranged in said partition and projected almost entirely into the large compartment, valves normally closing the ends of said body and the relatively remote ends of said compartments, the inner ends of said valves being disposed in said guide sleeve, a rod connecting said valves and extending through said guide sleeve, an enlargement formed upon said rod within said sleeve for engagement by the inner ends of said valves singly, push buttons at the opposite ends of said rod, and springs encircling said rod and connecting said buttons and the inner periphery of said valves.

2. In a condiment container and dispenser, a tubular body formed of a single piece of material, the ends of said body being of a greater interior diameter than the intermediate portion, a ledge formed at the junction of said ends with the intermediate body portion, an inner transverse partition dividing the intermediate body portion into compartments of unequal size, a guide sleeve arranged in said partition, valves normally closing the ends of said body and the intermediate compartments therein adjacent the said ledges, the inner ends of said valves being disposed in said guide sleeve, a rod connecting said valves and extending through said guide sleeve, an enlargement formed upon said rod within said sleeve for engagement with the inner ends of said valves singly, push buttons at opposite ends of said rod, and springs encircling said rod and connecting said buttons and the inner periphery of said valves.

In testimony that I claim the foregoing as my own I have hereto affixed my signature.

December 26th, 1924.

CLARENCE C. SPRINKLE.